(12) United States Patent
Napadensky et al.

(10) Patent No.: US 7,307,127 B1
(45) Date of Patent: Dec. 11, 2007

(54) HIGHLY SULFONATED BLOCK COPOLYMER HYDROGELS AND USES THEREOF

(75) Inventors: Eugene Napadensky, Newark, DE (US); Yossef A. Elabd, Baltimore, MD (US); Dawn M. Crawford, Bel Air, MD (US); James M. Sloan, Bel Air, MD (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 446 days.

(21) Appl. No.: 10/828,521

(22) Filed: Apr. 6, 2004

(51) Int. Cl.
*C08F 8/36* (2006.01)

(52) U.S. Cl. ............... 525/353; 525/343; 525/348; 525/189; 525/333.5; 525/344; 521/28; 521/33

(58) Field of Classification Search .......... 525/353, 525/343, 348, 189, 333.5, 344; 521/28, 33
See application file for complete search history.

(56) References Cited

U.S. PATENT DOCUMENTS

| | | | | |
|---|---|---|---|---|
| 3,553,286 A | * | 1/1971 | Murata et al. | 525/375 |
| 4,086,171 A | * | 4/1978 | Wood et al. | 508/390 |
| 5,039,752 A | * | 8/1991 | Storey et al. | 525/314 |
| 6,579,948 B1 | * | 6/2003 | Tan et al. | 525/333.5 |

* cited by examiner

*Primary Examiner*—James J. Seidleck
*Assistant Examiner*—Olga Asinovsky
(74) *Attorney, Agent, or Firm*—Edward L. Stolarun; William V. Adams

(57) ABSTRACT

A block copolymer composition AB is provided that has pendent groups —RZ extending from the A copolymer on at least 70 mol % of the A monomers, where R and Z are each an ionic species. The composition is included in a semipermeable membrane for use in a direct methanol fuel cell. Also described are articles of protective apparel comprising the composition which advantageously has barrier properties as well as superior water vapor transport properties.

17 Claims, 1 Drawing Sheet

HIGHLY SULFONATED BLOCK COPOLYMER HYDROGELS AND USES THEREOF

GOVERNMENT INTEREST

The invention described herein may be manufactured, used, and licensed by or for the United States Government.

FIELD OF THE INVENTION

This invention relates to a block copolymer composition and uses thereof. More specifically it relates to a block copolymer comprising polystyrene and polyisobutylene, wherein the polystyrene is over 70 mol % sulfonated.

BACKGROUND OF THE INVENTION

Selectively permeable materials are useful in a broad range of applications, including for example, chemical and/or biological protective clothing, separation membranes, fuel cell membranes, medical equipment, such as filters and masks, as well as medical apparel. Of particular concern in providing materials adapted to these uses is the selectivity profile necessary to function as intended. For example, a material provided as protective clothing must not only inhibit passage of toxins through the protective membrane from the external environment to the internal side, the material must also allow the passage of water vapor from the internal side to the external environment. Since the absence of adequate transpiration of water causes discomfort at the least and dangerous overheating if prolonged, water vapor passage characteristics are of paramount importance in designing materials for use in applications such as those listed above.

Materials and articles of manufacture designed to be selectively permeable include those detailed in U.S. Pat. Nos. 5,468,574; 5,679,482; 5,840,387; 6,110,616; 6,395,383; 6,187,696; 5,824,405; 5,743,775; 5,740,551; 5,391,426; 5,273,814; 5,260,360; 5,024,594; 4,943,475; 4,515,761; 4,510,193; 4,469,744; 4,194,041; and 4,039,440.

However, there is still a need for a lightweight, low cost material that combines the characteristics of flexibility over a broad temperature range, high transport of air and water vapor and low transport of harmful chemicals.

SUMMARY OF THE INVENTION

A copolymer composition is provided that includes a compound having the formula:

$$A—B \quad (I)$$

wherein A is a thermoplastic block copolymer including a monomer

B is an elastomeric block copolymer including a monomer

m and n are each independent integers between 10 and $10^7$; R is an anion; and Z is a cation; and wherein RZ is present on over 0.7 n of the monomer C in polymer A. In a preferred embodiment, block A is polystyrene and block B is polyisobutylene. R is an anion including oxygen and an element selected from the group consisting of a chalcogen and a pnictogen and R is preferably $SO_3$.

Z is a cation compatible with R and selected from the group consisting of H, a lanthanide species, an alkaline earth metal and an alkalai metal and Z is preferably H, Cs, Zn or Na. Optionally, a second block A may be bonded to block B.

Preferably, block A is present at levels ranging between 1-99% of the total block copolymer.

The present invention is also operative as a copolymer composition that includes a compound having the formula:

wherein A is a thermoplastic block copolymer

B is an elastomeric block copolymer including a monomer

—(D)$_m$;

A' is a thermoplastic block copolymer

m, n and q are each independent integers between 10 and $10^7$; R is an anion; and Z is a cation; P is a phenyl group, and RZ is present on over 0.7(n+g) of P. R in this compound is an anion including oxygen and an element selected from the group consisting of a chalcogen and a pnictogen. Z in this compound is a cation compatible with R and selected from the group consisting of H, a lanthanide species, an alkaline earth metal and an alkali metal. Preferably RZ is $SO_3H$.

A semipermeable membrane that includes a copolymer composition described herein is provided. Also described is a fuel cell including an inventive semipermeable membrane. Further provided is an article of apparel including a composition according to the invention.

DESCRIPTION OF THE PREFERRED EMBODIMENTS

Figure 1:
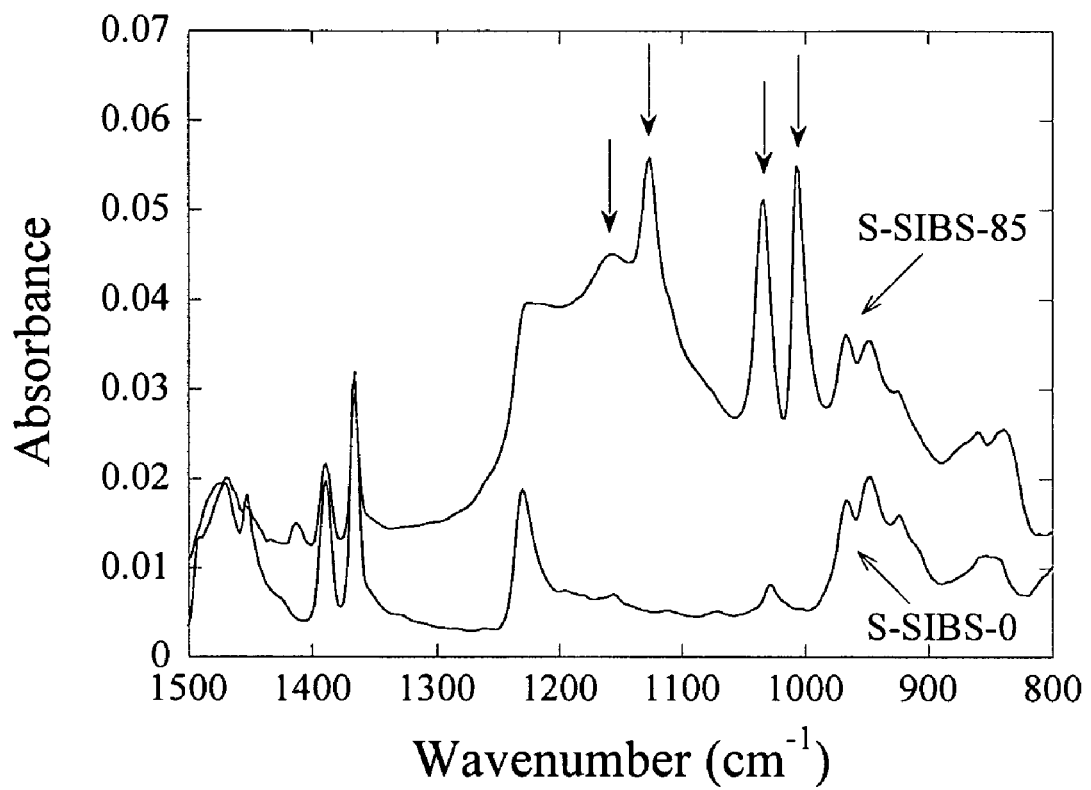
FIG. 1 is a plot illustrating infrared spectroscopy absorption spectra for sulfonated poly(styrene-b-isobutylene-b-styrene) (S-SIBS), a non-sulfonated material (S-SIBS-0) and the same material sulfonated to 85 mol % (S-SIBS-85), based on moles of sulfonic acid per mole of styrene repeat unit.

A material provided by this invention combines the flexible and hydrophobic properties of an elastomer with the hydrophilic properties of a hydrogel on a molecular level and self-assembles at the nano level to form a "nanostructured elastic hydrogel." In the solid state, the thermodynamic immiscibility of the two components results in a microphase separation. Self-assembled morphologies occur in block copolymers that are composed of thermodynamically immiscible constituent blocks, see e.g., Lu, et al., *Macromolecules,* 1993, 26, 6525. While related block copolymers have been reported in the literature, e.g., Weiss, R. A., Sen, A., Willis, C. L., Pottick, L. A., *Polymer,* 1991, 32, 1867; Lu, X., Steckle, W. P. Jr., Hsiao, B., Weiss, R. A., *Macromolecules,* 1995, 28, 2831; and Mani, S., Weiss, R. A., Hahn, S. F., Williams, C. E., Cantino, M. E., Khairallah, L. H., *Polymer,* 1998, 39, 2023, a block copolymer of the present invention is characterized by unique properties which facilitate its potential use in a wide variety of applications.

A composition provided by the present invention includes a block copolymer. The composition has the formula (I) wherein A and B are each block polymers, m and n each independently represent a number of monomer units present in a block polymer, and R and Z are each an ionic species.

Block A is preferably a thermoplastic polymer capable of being substituted with RZ. In a preferred embodiment shown above, block A is polystyrene. In a typical embodiment, the copolymer includes block A in amounts ranging from 1% to 99% by weight of the total block copolymer. In another embodiment, the copolymer includes block A in amounts ranging from 5% to 90% by weight of the total block copolymer. Further, the copolymer may include block A in amounts ranging from 10% to 70% by weight of the total block copolymer. The copolymer may be atactic, isotactic or syndiotactic with respect to the phenyl groups of the styrene block.

A second block B is present in amounts typically ranging from 1% to 99% by weight of the total unsulfonated block copolymer. Block B is preferably an elastomer, contributing to low temperature flexibility properties of the block copolymer. Block B also contributes to inhibition of passage of organic species, such as methanol, across a membrane including an inventive composition. In a preferred embodiment, block B is polyisobutylene.

As depicted above, blocks A and B are typically arranged in alternating order, and preferably, as a copolymer of the form A—B—A. In a preferred embodiment, the sulfonated copolymer is a polystyrene-polyisobutylene-polystyrene copolymer. Other embodiments can include, however, diblock copolymers, multiblock copolymers, graft copolymers, polymer blends and polymer networks. The number of repeating monomer units contained within each block, m and n, is an integer between 10 and $10^7$. Preferably, m and n are each independently between 10 and $10^4$.

Block A preferably includes RZ at a level of over 70 mol % of the block A monomer in the total copolymer. In a preferred embodiment wherein block A is polystyrene, RZ is present on over 70% of the styrene monomers of the total copolymer. Further preferred is the modification of styrene monomers to include RZ in the para position on the phenyl residue of the styrene monomer. In a typical embodiment R is an anion and Z is a cation. R is preferably an anion including both oxygen and a chalcogen or pnictogen element. In particular, R preferably includes both oxygen and an element selected from the group consisting of sulfur, phosphorus and nitrogen. Z is an organic or inorganic cation of essentially any valency compatible with R. Illustrative examples include H, lanthanide species, alkaline earth metals and alkalai metals. Particularly preferred is the composition wherein R is $SO_3$ and Z is H or Cs. Also preferred is the composition wherein Z is Zn, Cu or Na.

As noted above, block A preferably includes RZ at a level of over 70 mol % of the block A monomer in the total copolymer. The identity of RZ is homogeneous or heterogeneous in an inventive copolymer. For example, in one embodiment the identity of RZ is homogeneous, that is, substantially all RZ is $SO_3H$. In another embodiment, the identity of RZ is heterogeneous, for example, a portion of RZ is $SO_3H$ and a portion is $SO_3Cs$.

Methods of modification of block A to incorporate RZ include sulfonation and phosphonation of the polymer. Sulfonation of a polystyrene block is performed by conversion of a portion of the styrene monomer to styrene-sulfonic acid. Methods of sulfonation are known in the art. For example, methods detailed in Mountz, D. A., Reuschle, D. A., Brister, L. B., Storey, R. F., Mauritz, K. A., *ACS Polymer Preprints,* Spring 1997, 39, 383; Weiss R. A. et al., *Polymer* 32:1867 (1991); and U.S. Pat. No. 3,870,841 are operative herein. Sulfonation methodology is also detailed in Examples 1 and 2 included herein. It had been previously thought that achieving sulfonation levels above 70 mol % of the polystyrene monomer in the copolymer was impractical or impossible. In particular, earlier examples of sulfonated polymers tended to be restricted to lower sulfonation levels, at least in part due to reservations regarding solubility and effects of precipitation on the sulfonation process. For example, Mountz et al., referenced above, demonstrates only about 21% sulfonation. In contrast to doubts regarding feasibility of achieving high levels of sulfonation, a composition according to the present invention is demonstrated to attain sulfonation to levels above 70 mol % of the styrene monomer present in the copolymer. Although decreases in solubility with increasing sulfonation level are observed, this surprisingly does not prevent further sulfonation.

Table 1 shows polystyrene-polyisobutylene-polystyrene copolymer sulfonated to three different levels, 77, 85, and 88 mol %. Sulfonation level and ion exchange capacity (IEC) (mmol sulfonic acid/g polymer or meq/g) for each polymer is determined by both titration and elemental analysis. In addition, Table 1 shows the reaction efficiency of each polymer derived from the moles of acid used in the reaction per moles of styrene and the sulfonation level.

TABLE 1

Results of Sulfonation Reactions for sulfonated PS-PIB-PS.

| Sample Name | Sulfonation Level (mole %) | IEC (mq/g) | Moles Acid/ Moles Styrene | Reaction Efficiency (%) |
|---|---|---|---|---|
| S-SIBS-77 | 77 | 1.78 | 1.97 | 39 |
| S-SIBS-85 | 85 | 1.97 | 3.54 | 24 |
| S-SIBS-88 | 88 | 2.04 | 6.83 | 13 |

Infrared spectroscopy is used to confirm sulfonation. FIG. 1 shows spectra for S-SIBS-0 and S-SIBS-85, i.e., the polymer before and after sulfonation). Four bands in S-SIBS-85 indicated with arrows represent stretching vibrations associated with sulfonation. The in-plane bending vibrations of the aromatic ring in styrene para-substituted with the sulfonate group and the sulfonate anion attached to the aromatic ring are represented at 1006 and 1127 cm$^{-1}$, respectively, while the bands at 1034 and 1156 cm$^{-1}$ resent the symmetric and asymmetric stretching vibrations of the sulfonate group, respectively.

The distribution of sulfonated phenyl groups of the styrene blocks is generally random throughout the polymer but may be ordered as isotactic or syndiotactic.

An inventive composition optionally includes an additive selected from the group consisting of polymers, chemical stabilizers, bio-active species, and metals, and mixtures thereof. The chemical stabilizer can be, for example, an anti-oxidant, and the bio-active species can be an antiseptic.

Semipermeable Membrane

A composition according to the invention is included in a semipermeable membrane in amounts ranging from 0.5-100%. Inclusion of the inventive material provides a semipermeable membrane having particularly desirable properties, such as low temperature flexibility, selective transport, ease of processability, and cost-effectiveness.

An inventive membrane is particularly advantageous in providing for selective transport of water and organic compounds. These properties render the membrane useful in various applications, including, for example, chemical and/or biological protective clothing, separation membranes, fuel cell membranes, medical equipment, such as filters and masks, as well as medical apparel. Further specific applications include use of an inventive membrane in water treatment and purification, as a biomaterial for bioadhesives, drug delivery devices, biosensors, surgical implants and the like. In particular, a membrane including polystyrene-polyisobutylene-polystyrene copolymer sulfonated to a level over 70 mole percent has desirable water transport properties as well as advantageous exclusion characteristics.

A polymer used in construction of clothing designed to be protective against toxins is required to be permeable to water vapor so as to render the material "breathable." In addition, such a material must inhibit passage of toxic substances from the external environment. A membrane including a polymer according to the invention has the desirable characteristics of high water vapor permeability combined with toxin barrier properties. In particular, a SIBS copolymer sulfonated to over 70 mol % is selectively permeable with regard to water and toxic compounds.

Table 2 shows transport characteristics of a membrane including an inventive copolymer sulfonated as described, to over 70 mol %.

In addition to conductivity, both water vapor and DMMP vapor permeabilities are measured. Table 2 shows that S-SIBS-85 has a higher selectivity than NAFION®, expressed as water/DMMP ratio of permeabilities.

TABLE 2

Transport Properties of sulfonated PS-PIB-PS.

| | Proton Conductivity (S/cm) | Water Vapor Permeability (g/mmHg m day) | DMMP Vapor Permeability (g/mmHg m day) | Water/DMMP Selectivity |
|---|---|---|---|---|
| S-SIBS-77 | 0.0558 | — | — | — |
| S-SIBS-85 | 0.0638 | 0.0109 ± .0015 | 0.0045 ± .0006 | 2.41 |
| S-SIBS-88 | 0.0764 | — | — | — |
| NAFION® 117 | 0.027 | 0.0245 ± .0006 | 0.0113 ± .0005 | 2.17 |

Further characteristics of an inventive composition are shown in Table 3. These data demonstrate IEC, density and water solubility of SIBS copolymers sulfonated to over 70 mol %. Density is measured with helium pycnometry. Water solubility, in weight %, refers to amount of weight increase above dry weight when samples are placed in water. S-SIBS-85-Cs is S-SIBS sulfonated to 85 mol % where the cation is cesium, as opposed to protonic cations in the other samples detailed in Table 3. From visual observations, the S-SIBS-88 membrane increased approximately 2.5 times its area after immersion in water, but remains completely immiscible in water.

TABLE 3

Density and water uptake.

| Sample Name | Sulfonation Level (mole %) | IEC meg/g | Density (g/cm$^3$) | Water Solubility (wt %) |
|---|---|---|---|---|
| S-SIBS-77 | 77 | 1.78 | 1.25 ± 0.09 | 351.00 ± 1.03 |
| S-SIBS-85 | 85 | 1.97 | 1.31 ± 0.04 | 307.67 ± 3.04 |
| S-SIBS-88 | 88 | 2.04 | 1.24 ± 0.1 | 348.36 ± 2.91 |
| S-SIBS-85-Cs | 85 | | 1.42 ± 0.02 | 196.27 ± 1.45 |

Various fabrication techniques can be employed to produce a semipermeable membrane including an inventive composition. For example, a semipermeable membrane can be fabricated by a technique known in the art, such as casting from a solvent, spray coating, melt processing, and roll casting. Examples of formation of a semipermeable including an inventive composition are detailed in Examples 1 and 2.

In a typical embodiment, the semipermeable membrane can have a thickness ranging from about 5 microns to about 5 millimeters. In some application the semipermeable membrane has a thickness of from about 0.05 millimeters to about 2 millimeters. Other thicknesses can of course be employed, however, depending upon the particular application in which the membrane is to be used.

It has been demonstrated that the unmodified polymer exhibits changes in polymer morphology as a function of the rate of solvent evaporation. Slower evaporation times lead to improved long-range order. However, these changes in morphology do not affect the permeation properties of the copolymer. Data indicate that the block copolymer in the unmodified form behaves as a barrier material, blocking water and polar organic compounds. Modification via sulfonation of styrenic components of the polymer chain disrupts the morphology of the copolymer with little change observed as a function of processing method. Details of the polymer morphology with regard to processing conditions can be found in Crawford, D. M., Napadensky, E., Beck Tan, N. C., Reuschle, D. A., Mountz, D. A., Mauritz, K. A., Laverdure, K. S., Gido, S. P., Liu, W., Hsiao, B., "Structure/

Property Relationships in Polystyrene-Polyisobutylene-Polystyrene Block Copolymers," *Thermochimica Acta*, v.367-368:125-134, 2001.

Solution processing of sulfonated PS-PIB-PS under non-equilibrium conditions, such as in solvent casting or spraying, results in films with microphase separated morphology, and permselective characteristics. The observed properties of the sulfonated block copolymers, coupled with their ease of processing, demonstrate their suitability for numerous applications requiring a semipermeable membrane.

A significant advantage of the semipermeable membrane is that the membrane is capable of remaining flexible at a temperature of at least −60° C. The lower limit of flexibility is defined as the glass transition temperature of the rubbery or elastomeric phase. This phase is principally composed of a block B polymer, such as polyisobutylene. The glass transition temperature of the rubbery or elastomeric phase is defined as the temperature of the peak in a plot of the dynamic loss modulus (E") versus temperature. Although the block copolymer exhibits increased stiffness at higher levels of sulfonation, the elastomeric properties of the block copolymer are not compromised, and the temperature of the PIB glass transition remains at approximately −60° C. This suggests that the sulfonated block copolymer will remain flexible over a broad temperature range, as is required in applications such as protective clothing.

Another significant advantage of the semipermeable membrane is that the membrane is selective to liquid penetrants depending on the size and polarity of the penetrants. More specifically, the membrane has sufficient selectivity so as to be capable of allowing water to diffuse therethrough at a higher rate than virtually all organic liquids having a molecular weight higher than that of methanol.

An inventive composition is included in a semipermeable membrane in any of various forms, illustratively including a single freestanding membrane, one of a plurality of membranes, a laminate, and a composite. An inventive composition may be distributed in various ways in a membrane. For example, the composition may be distributed approximately uniformly throughout a membrane, or may be present in domains which are distributed within the membrane. Such domains may be distributed randomly or in an ordered fashion. Generally, such domains will extend transversely from one side of a membrane through to the other side, facilitating or inhibiting permeation of a specified substance through the membrane.

In one example, the semipermeable membrane can be employed in a semipermeable laminate. The laminate comprises (a) one or a plurality of semipermeable membrane layers produced from an unsulfonated block copolymer including polystyrene and polyisobutylene segments, with the membrane layer including a sulfonated block copolymer including poly(styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein over 70 mole % of the polystyrene monomer in the unsulfonated polystyrene and polyisobutylene block copolymer is converted to styrene sulfonic acid in the sulfonated block copolymer; and (b) a substrate.

In a further exemplary embodiment, a laminate construction can comprise a "sandwich" configuration, i.e., a semipermeable membrane layer, a substrate layer, another semipermeable membrane layer, another substrate layer, and so on, depending upon the particular application of the membrane. Other configurations can comprise variations of the aforementioned sandwich configuration, including a plurality of semipermeable membrane layers, a plurality of substrate layers, and so forth, including mixtures thereof.

In another embodiment, the invention is directed to a semipermeable layer in which the membrane is dispersed throughout a substrate. The semipermeable layer comprises (a) a semipermeable membrane produced from an unsulfonated block copolymer including polystyrene and polyisobutylene segments, with the membrane including a sulfonated block copolymer including poly(styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein over 70 mole % of said polystyrene monomer in the unsulfonated polystyrene and polyisobutylene block copolymer is converted to styrene sulfonic acid in the sulfonated block copolymer; and (b) a substrate, wherein the membrane is dispersed throughout the substrate. Various types of dispersion can include, for example, a dispersion in which the semipermeable membrane is embedded or imbibed into a porous substrate; a dispersion in which the membrane is encapsulated within another material; and a dispersion in which the membrane material is mixed with another material, as in a polymer blend, or in an emulsion in which the membrane phase is commingled with a matrix or liquid, either as a discontinuous, dispersed phase, as a co-continuous phase, or as a matrix, that is, in which the membrane is the continuous phase.

A substrate is typically a material capable of accommodating the one or a plurality of semipermeable membrane layers, and can be, for example, a fabric.

An inventive membrane can be used in medical applications, such as, for example, in medical equipment including any of the aforementioned various embodiments of the semipermeable membrane. The medical equipment can be selected, for example, from the group consisting of gloves, screens, drapes, masks, and breathable dressings, shirts, trousers, gowns, overboots, socks, hoods, caps, helmets, and eye goggles.

Fuel Cell

A direct methanol fuel cell (DMFC) is an increasingly attractive option for energy production due to light weight and high power density. A membrane included in a direct methanol fuel cell separates the anode from the cathode and is required to have properties of proton conductivity while inhibiting methanol permeability. One of the critical problems that has hindered the progress of the direct methanol fuel cell is low proton conductivities and high methanol permeation rates in the separation membrane.

A membrane including an inventive polymer composition has desirable conductivity characteristics as illustrated in Table 2. In particular, note that the proton conductivity of S-SIBS-88 is 3 times higher than NAFION® 117, a membrane polymer most frequently used polymer in fuel cells. This high proton conductivity relates to high fuel cell power densities and enhanced fuel cell performance.

Table 4 also illustrates transport properties relating to a membrane useful in a direct methanol fuel cell.

TABLE 4

Proton Conductivities and Methanol Permeabilities of Sulfonated PS-PIB-PS.

| Sample Name | Sulfonation Level (mole %) | IEC (meq/g) | $\sigma^\dagger$ Proton Conductivity (S/cm) (× 10$^2$) | P§ Methanol Permeability (cm$^2$/s) (× 10$^6$) | $\sigma$/P Selectivity (S s/cm$^3$) (× 10$^{-4}$) |
|---|---|---|---|---|---|
| NAFION ® 117 | — | 0.91 | 2.7 | 2.01 | 1.34 |
| S-SIBS-0 | 0 | — | — | — | — |
| S-SIBS-77 | 77 | 1.78 | 5.58 | 4.01 | 1.39 |
| S-SIBS-85 | 85 | 1.97 | 6.38 | 5.41 | 1.18 |
| S-SIBS-88 | 88 | 2.04 | 7.64 | 4.69 | 1.63 |
| S-SIBS-85-Cs | 85 | 1.97 | 1.86 | 3.83 | 0.49 |

†Proton conductivity is measured normal to the plane of the film using AC impedance spectroscopy. Details of this technique are described in more detail in Elabd, Y. A et al., Triblock copolymer ionomer membranes Part I. Methanol and proton transport. *Journal of Membrane Science*, 217: 227-242, 2003.

§ Methanol permeability is measured with a diffusion cell equipped with an infrared spectroscopic detector. The details of this procedure are described in more detail in Elabd, Y. A.; Napadensky, E.; Sloan, J. M.; Crawford, D. M.; Walker, C. W. *Journal of Membrane Science*, 217 (2003) 227.

Thus, in one embodiment, an inventive composition is included in an ion-conducting membrane for use in a fuel cell. For example, in a fuel cell including a semipermeable laminate, the laminate comprises (a) one or a plurality of semipermeable membrane layers produced from an unsulfonated block copolymer including polystyrene and polyisobutylene segments, the membrane layer including a sulfonated block copolymer including poly(styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein over 70 mole % of the polystyrene monomer in the unsulfonated polystyrene and polyisobutylene block copolymer is converted to styrene sulfonic acid in the sulfonated block copolymer; and (b) a substrate.

In another embodiment, in a fuel cell including a semipermeable layer, the layer comprises (a) a semipermeable membrane produced from an unsulfonated block copolymer including polystyrene and polyisobutylene segments, the membrane including a sulfonated block copolymer including poly(styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein over 70 mole % of the polystyrene monomer in the unsulfonated polystyrene and polyisobutylene block copolymer is converted to styrene sulfonic acid in the sulfonated block copolymer; and (b) a substrate, wherein the membrane is dispersed throughout the substrate.

In another embodiment, in a separation membrane capable of separating a first constituent from a second constituent or from a plurality of constituents, the membrane comprises any of the aforementioned various embodiments of the semipermeable membrane.

EXAMPLES

Example 1

An example of the synthesis of an inventive composition is described here. The unmodified poly(styrene-isobutylene-styrene) (PS-PIB-PS) copolymer is provided by Kuraray Co., Ltd., Tsukuba research laboratories (sample name-TS-3000S, lot. no. 990215), with the reported properties: 30.84 wt % styrene, 0.95 specific gravity, $M_w$=71,920 g/mol, $M_n$=48,850 g/mol, and PDI=1.47. Sulfonation of PS-PIB-PS is performed by dissolving 25 g of the copolymer in 300 ml of methylene chloride. This solution is refluxed, while a specified amount of a solution of acetyl sulfate (enough to produce over 70 mol % sulfonation of the styrene) in methylene chloride is added. The acetyl sulfate solution included 150 ml of methylene chloride, 27 ml of sulfuric acid, 53 ml of acetic anhydride, this yielded a polymer with 88% sulfonation level (S-88-SIBS). For S-77-SIBS 150 ml of methylene chloride, 7.8 ml sulfuric acid and 18.5 ml of acetic anhydride is used. For S-85-SIBS 150 ml of methylene chloride, 28 ml sulfuric acid, and 38.5 ml of acetic anhydride is used. The reaction is terminated after 5 hrs by adding approximately 30-50 ml of methanol. The reacted polymer solution is then precipitated with warm water. The precipitate is washed several times with hot water and acetone, dried in a vacuum oven at 45° C. for 24 hrs, washed in cold water two times, and then dried again at 45° C. for 24 hrs. The sulfonation levels are determined by both titration and elemental analysis (EA). Titration is accomplished by dissolving 0.5 g of polymer in 30 ml of tetrahydrofuran (THF) and then titrating with 0.02 N sodium hydroxide in methanol to the phenolthalein endpoint with a thymol blue indicator. The sodium hydroxide solution is standardized against glacial acetic acid.

After sulfonation and evaluation, the sulfonated PS-PIB-PS samples are then dissolved in a mixed solvent of toluene/hexanol (85/15, w/w) at 5% (w/v) and cast from solution in open Teflon Petri dishes for approximately 3-4 days at ambient conditions. Solvent-cast membranes are then annealed in a vacuum oven at 50° C. for an additional two weeks to remove any residual solvent. Film thicknesses are approximately 200-300 μm. Sulfonated PS-PIB-PS can also be solvent-cast from cyclohexanone, cyclohexanol, benzene, chloroform, methylene chloride, or tetrahydrofuran. Also, the sulfonated PS-PIB-PS can be thermally pressed into a flexible film.

Example 2

A PS-PIB-PS tri-block copolymer such as TS-3000s (produced by Kuraray Co., Ltd., Tsukuba Research Laboratories, Toukuba City, Japan) is employed as the base polymer for preparation of one embodiment of the semipermeable membrane described herein. Typical properties of this base polymer are shown in Table 5.

TABLE 5

Properties of TS-3000s Block Copolymer.

| Property | TS-3000s |
|---|---|
| Styrene Content (wt. %) | 30 |
| Specific Gravity | 0.95 |
| Hardness (JIS-A) | 56 |
| Tensile Strength (Mpa) | 10.8 |
| Elongation (%) | 440 |

The base copolymer is chemically modified by sulfonation in a solution of dichloromethane and hexane at 50° C. with acetyl sulfate. A detailed description of the sulfonation procedure is found herein.

The sulfonated PS-PIB-PS samples are then dissolved in 85% by weight toluene and 15% by weight hexyl alcohol to create a solution of 1% polymer by weight. The solutions are formed over a period of 24 hours and then cast into 4-inch diameter polytetrafluoroethylene ("PTFE") petri dishes. 50 ml of a 1% polymer solution was used for each petri dish. Once cast, the open petri dish is set to dry under a hood until a dry film is formed (approximately 2-4 days). Typical film thickness ranges from 2-5 mil depending on the curvature on the bottom surface of the casting dish.

Solutions for sprayed films are made according to the procedure described above resulting in a polymer concentration of 5% by weight. Approximately 50 ml of the polymer solution is sprayed over a 4-inch diameter PTFE dish and is allowed to dry under a hood. An air gun operated at 40 psi is used to spray the polymer solution. Use of an air gun, which is typically used for paint application, results in a broad, poorly focused spray, and thus it is difficult to estimate the exact volume of solution that actually results in film formation. However, 50 ml of 5% polymer solution results in good films. Films used for investigation of transport properties are made by casting the polymer solution (1% by weight) directly onto the surface of an ATR crystal for FTIR investigation.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:

1. A copolymer composition comprising a compound having the formula:

(I)

wherein A is a thermoplastic block copolymer including a monomer

 ;

B is polyisobutylene including a monomer —$(D)_m$; m and n are each independent integers between 10 and $10^7$; R is an oxygen and an element selected from the group consisting of a chalcogen, nitrogen, and phosphorus; and Z is a cation; and RZ is present on over 70 mol percent of the monomer

in copolymer A to provide an ion exchange capacity of between 1.78 and 2.04 milliequivalents per gram of said compound.

2. The copolymer composition of claim 1 wherein A is polystyrene.

3. The copolymer composition of claim 1 wherein R is $SO_3$.

4. The copolymer composition of claim 1 wherein Z is a cation compatible with R and selected from the group consisting of H, a lanthanide species, an alkaline earth metal and an alkali metal.

5. The copolymer composition of claim 4 wherein Z is Cs.

6. The copolymer composition of claim 1 further comprising a second block A bonded to block B.

7. The copolymer composition of claim 1 wherein block A is present at levels ranging between 1-99% of the total block copolymer.

8. The copolymer composition of claim 1 wherein block A is present at levels ranging between 5-90% of the total block copolymer.

9. The copolymer composition of claim 1 wherein block A is present at levels ranging between 10-70% of the total block copolymer.

10. A copolymer composition comprising a compound having the formula:

(II)

wherein A is a thermoplastic block copolymer including a monomer

 ;

B is polyisobutylene including a monomer

 ;

A' is a thermoplastic block copolymer including a monomer

 ;

m and n are each independent integers between 10 and $10^7$; R is oxygen and an element selected from the group consisting of a chalcogen, nitrogen, and phosphorus; and Z is a cation; P is a phenyl group, and RZ is present on over 70 mol percent of the monomer

and the monomer

to provide an ion exchange capacity of between 1.78 and 2.04 milliequivalents per gram of said compound.

11. The copolymer composition of claim 10 wherein Z is a cation compatible with R and selected from the group consisting of H, a lanthanide species, an alkaline earth metal and an alkali metal.

12. The copolymer composition of claim 10 wherein R is $SO_3$.

13. The copolymer composition of claim 10 wherein Z is selected from the group consisting of: H, Cs, Zn and Na.

14. The copolymer composition of claim 10 wherein RZ is $SO_3H$.

15. The copolymer composition of claim 10 wherein block A is present at levels ranging between 1-99% of the total block copolymer.

16. The copolymer composition of claim 10 wherein block A is present at levels ranging between 5-90% of the total block copolymer.

17. The copolymer composition of claim 10 wherein block A is present at levels ranging between 10-70% of the total block copolymer A and A'.

* * * * *